United States Patent
Grigorov

(10) Patent No.: US 10,474,714 B2
(45) Date of Patent: Nov. 12, 2019

(54) METHOD AND COMPONENT FOR CLASSIFYING RESOURCES OF A DATABASE

(71) Applicant: KBLE LTD, Sofia (BG)

(72) Inventor: Ilko Grigorov, Sofia (BG)

(73) Assignee: KBLE LTD, Sofia (BG)

( * ) Notice: Subject to any disclaimer, the term of this patent is extended or adjusted under 35 U.S.C. 154(b) by 243 days.

(21) Appl. No.: 13/874,819

(22) Filed: May 1, 2013

(65) Prior Publication Data

US 2014/0330803 A1 Nov. 6, 2014

(51) Int. Cl.
*G06F 16/58* (2019.01)

(52) U.S. Cl.
CPC .................. *G06F 16/5866* (2019.01)

(58) Field of Classification Search
CPC ........... G06F 17/30268; G06F 16/5866
See application file for complete search history.

(56) References Cited

U.S. PATENT DOCUMENTS

| | | | |
|---|---|---|---|
| 7,231,381 B2 | 6/2007 | Chen et al. | |
| 8,489,627 B1 * | 7/2013 | Brandt | 707/765 |
| 8,812,519 B1 * | 8/2014 | Bent | 707/748 |
| 2001/0044795 A1 * | 11/2001 | Cohen | G06F 17/30699 |
| 2002/0161747 A1 | 10/2002 | Chen et al. | |
| 2003/0037034 A1 * | 2/2003 | Daniels | G06Q 10/087 |
| 2004/0205065 A1 * | 10/2004 | Petras | B01D 3/146 |
| 2005/0055357 A1 * | 3/2005 | Campbell | G06F 8/61 |
| 2010/0290699 A1 * | 11/2010 | Adam et al. | 382/155 |
| 2012/0148158 A1 * | 6/2012 | DeSpain | G06F 17/30265 382/190 |
| 2013/0170738 A1 * | 7/2013 | Capuozzo | G06F 17/30265 382/159 |
| 2014/0236851 A1 * | 8/2014 | Barrington | G06F 17/30268 705/321 |

* cited by examiner

*Primary Examiner* — Jay A Morrison
(74) *Attorney, Agent, or Firm* — Horizon IP Pte. Ltd.

(57) ABSTRACT

A method of retrieving information comprises providing a query to a search engine and retrieving from the search engine a resource set, comprising at least one image matching the query. A representation of the resource set and a representation of a set comprising at least one condition are displayed via a user interface component. The condition set is associated with the query and is distinct from at least one other condition set associated with another query. Responsive to user interaction with the user interface component, one or more user selected images from the resource set are associated with a user selected condition from the condition set, to thereby classify the images.

18 Claims, 2 Drawing Sheets

METHOD AND COMPONENT FOR CLASSIFYING RESOURCES OF A DATABASE

FIELD OF THE INVENTION

The present invention relates to a method and component for classifying resources of a database, and in particular, resources comprising image and/or video data.

BACKGROUND OF THE INVENTION

Information retrieval systems, or search engines, such Google and Yahoo, maintain databases comprising information about web pages and are arranged to provide lists of results, ranked in order of assumed relevance, in response to queries raised by users of the systems. To this end, the systems employ automated software programs to investigate any links they encounter. The contents of each page are then analyzed, indexed accordingly and stored in an index database for retrieval in response to related queries.

In general, the content of the pages is analysed by extracting words from titles, headings, or special fields such as meta-tags, and classified accordingly. However, for resources comprising image or video based data, information retrieval systems typically rely on context in which the resource is used in order to classify the resource and store it accordingly.

It is appreciated that if images could be labelled according to their content as an alternative or in addition to their context, the retrieval of images by search engines or other such applications could be made much more effective. The problem however is how to improve the rate and quality of labelling provided by authors or users.

In order to improve the classification of resources comprising image and/or video data, Google developed Google Image Labeler. Google Image Labeler was a feature of Google Image Search that allows a user to label images to thereby help improve the quality of Google's image search results. By availing of human labelling of images, the images are associated with the meaning or content of the image, as opposed to being indexed solely on the context in which they arose, thereby enabling Google to provide a more accurate and detailed database of resources.

US 2002/0161747 discloses a media content search engine for extracting and associated text content with media content, however, the engine is limited to enabling a user to define whether or not a given piece of content is relevant or not to any given query.

The object of the present invention is to provide an improved method and component for classifying resources of a database.

SUMMARY OF THE INVENTION

According to the present invention, there is provided an information retrieval system including a user interface component and operable to provide a query to a search engine and to retrieve from the search engine a resource set, comprising at least one image matching said query, the user interface component, when instantiated, being arranged to provide a representation of said resource set and a representation of a set comprising at least one condition to a display, said condition set being associated with said query and being distinct from at least one other condition set associated with another query, the instance of said user interface component being responsive to user interaction therewith to associate one or more user selected images from said resource set with a user selected condition from said condition set, to thereby classify said images.

Preferably, said system comprises a database for storing condition sets in association with respective queries.

Preferably, said system comprises a database for storing and classifying said resource set according to the user selected associations.

Preferably, said system is arranged to identify the user and provide an appropriate resource set to the user based on user information stored in the database.

Preferably, said system is arranged to calculate a group agreement parameter for the classification of said resource set based on the number of users presented with the resource set and the number of users who associated an item from that set with a given condition.

Preferably, said system is further arranged to calculate a user credibility factor based on the discrepancy between associations made by that user, and associations made by the other users.

Information retrieved from the user interface component is utilised to modify the manner in which descriptions of resources are validated, disambiguated, classified and extended and the manner in which new descriptions are generated for such types of resources.

BRIEF DESCRIPTION OF THE DRAWINGS

Embodiments of the invention will now be described by way of example with reference to the accompanying drawing, in which.

DETAILED DESCRIPTION OF THE INVENTION

Figure 1:
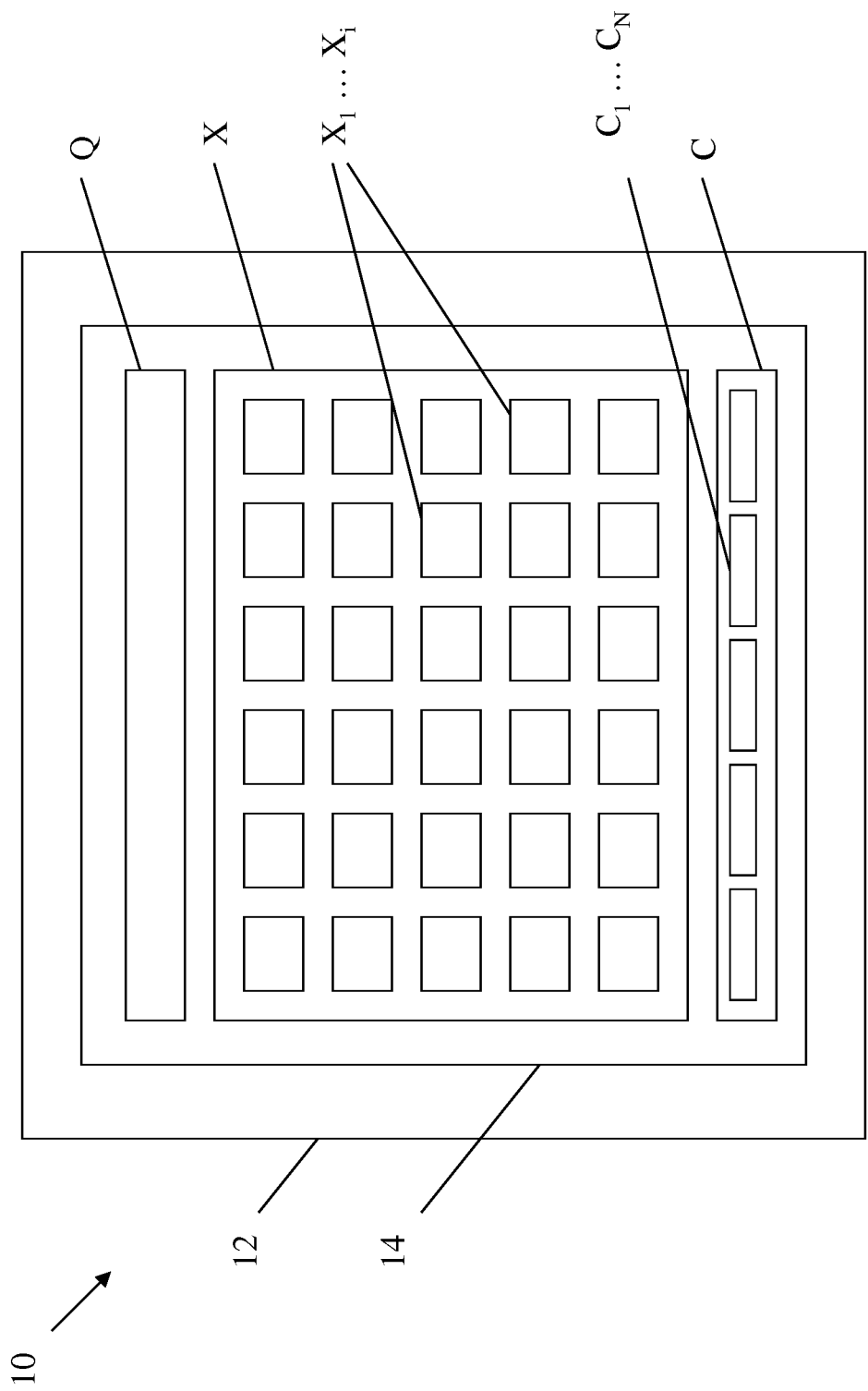
FIG. 1 illustrates a graphical user interface component provided according to a preferred embodiment of the present invention.

Referring to FIG. 1 of the accompanying drawings, there is illustrated a display 12 provided by an electronic device 10, whereon a user interface component 14 is presented, according to a preferred embodiment of the present invention.

On instigation, as illustrated in FIG. 1, the user interface component 14 displays a resource set X comprising a plurality of resources $X_1$ to $X_i$, a query, Q, and a condition set, C, comprising a plurality of conditions $C_1$ to $C_n$.

In a simple case of the preferred embodiment of the present invention, in response to the query Q, a user is requested to select, from the set of data X, a subset of data $Y_{C1}$, which conforms to a condition $C_1$.

For example, the user U may be provided with a query, Q, such as, "Is this a floral image?" or "Floral image", where the condition, $C_1$, is "Yes". Thus, a subset $Y_{C1}$, of resources selected from the set X, by the user, U, is assumed to comprise floral images.

In one such embodiment, the non-selected resources, of set X are assumed to comprise non-floral images, and are preferably stored as a set $Z_Q$. However, it will be appreciated that the non-selected resources may be nonetheless somewhat related to the condition, for example, the set may comprise an image of a cherry blossom tree, which is not in bloom and as such, the user, U, does not consider the image to satisfy the condition.

By introducing a second condition, $C_2$, for example, "No", the user may be requested to select two subsets of resources from the set X, i.e., a first subset, $Y_{C1}$, which comprises floral images, and a second subset, $Y_{C2}$, which does not comprise floral images, thereby providing the component with a more detailed analysis of the set X.

In such an embodiment, any resources of the set X which were not considered by the user, U, as satisfying either of the conditions $C_1$ or $C_2$, and as such, do not belong to subsets $Y_{C1}$, or $Y_{C2}$, are preferably retained in a further subset $Z_Q$, which is considered to comprise resources which relate somewhat to the query, Q, in that they weren't identified as belonging to the subset $Y_{C2}$, for example, the non blooming cherry blossom tree.

In an alternative embodiment, the condition $C_1$ may be 'relevant' and the condition $C_2$ may be 'irrelevant'. In such an example, the subset $Y_{C1}$, may comprise floral images, as well as any other images the user deems relevant to the query, such as images of flower shops, florists, or indeed, cherry blossom trees.

Thus, in order to obtain a more refined analysis, in a more comprehensive case, the user is presented with a set of images X, and a set of conditions $\{C_1, C_2, C_3 \ldots C_N\}$, and in response to a query Q, is requested to select subsets of images $\{Y_{C1}, Y_{C2}, Y_{C3}, \ldots Y_{CN}\}$, from the set X, which conform respectively to the conditions.

For example, consider the case wherein three conditions, $C_1$, $C_2$, and $C_3$, are presented to the user, U, namely, flowers in bloom, flower buds, and wilted flowers. The user U is presented with a set of images, X, and is required to indicate from that set, those that satisfy the first condition, i.e. flowers in bloom, those that satisfy the second condition, i.e., flower buds, and those that satisfy the third condition, i.e. wilted flowers. In this example, the query Q simply asks the user to choose resources from the set X that comply with each condition.

Thus, it will be appreciated that in this case, such a query is somewhat self evident, in particular due to the conditions presented i.e. $C_1$, $C_2$, and $C_3$, which comprise sufficient information to enable the user to decipher the selections he or she is requested to make. As such, it is appreciated that under certain circumstances, it is not necessary to provide the user with a query, Q.

Retrieval of such information from multiple users with respect to the set of resources X, provides a collection of sets of resources, $S=\{S_{U1}=\{Y_{U1,C1}, Y_{U1,C2}, Y_{U1,C3}, \ldots Y_{U1,CN}\}$, $S_{U2}=\{Y_{U2,C1}, Y_{U2,C2}, Y_{U2,C3}, \ldots Y_{U2,CN}\}, \ldots, S_{UM}=\{Y_{UM,C1}, Y_{UM,C2}, Y_{UM,C3}, \ldots Y_{UM,CN}\}\}$ describing each users selection of resources from the set X, and pertaining to each condition $\{C_1, C_2, C_3 \ldots C_N\}$.

In the preferred embodiment, a group agreement parameter $G_X$ is deduced from the sets of resources S for each item presented within the set $X=\{X_1, X_2, X_3 \ldots X_i\}$. Preferably, a group agreement parameter $G_{Xj}$ calculated for an item $X_j$ is based on the number of users U, who viewed the item $X_j$, and the number of users who selected the item $X_j$ as being relevant to a given condition $\{C_1, C_2, C_3 \ldots C_N\}$. The higher the value of the group agreement parameter $G_X$, for a particular item $X_j$, the greater the probability of relevance of the item to the given condition.

In the preferred embodiment, the group agreement parameter $G_X$ is utilised for further retrieval and ranking of search results.

In the preferred embodiment, each user $U=\{U_1, U_2, U_3 \ldots U_M\}$ is assigned a user credibility factor, ß. The user credibility factor, ß, is calculated for each user, based on the discrepancy between selections made by that user, and selections made by the other users, as exemplified by the group agreement parameter $G_X$. For example, if an image $X_j$, shown to one hundred users is selected by ninety two of those users as being relevant to a given condition C, and is selected by five of those users as being irrelevant, the user credibility factor, ß, associated with those five users having deviated from the norm, is decreased, and the further selections made by those users are considered to carry a lower credibility or weighting.

In one embodiment, users are tested periodically by asking them to classify (or annotate) a set of known resources. For example, users presented with a set of images X, are requested to indicate whether the images display a dog, the first condition being the affirmative, the second condition the negative. The user credibility factor ß of those users incorrectly selecting images that do not relate to the query as being affirmative is substantially decreased.

In the preferred embodiment, an account comprising a history log is maintained for each user U, from which various statistics, such as the credibility of the user in general, behaviour, accuracy, and attention to detail of the user, may be deduced or derived.

In the preferred embodiment of the present invention, the user interface component is arranged to operate in a plurality of modes.

One such mode is 'Validation Mode'. Information retrieved by the user interface component when operating in 'Validation Mode' is designed to verify descriptions of labels of resources. In the preferred embodiment, 'Validation Mode' involves the user, U, being presented with two conditions, $C_1$ and $C_2$, where $C_1$ is a condition 'relevant' and $C_2$ is a condition 'irrelevant' and requested to select from a set of resources X, two subsets, $Y_{C1}$, and $Y_{C2}$.

Another mode is 'Disambiguation Mode', which is employed for resolving ambiguities. For example, a user may be provided with a set of images X having associated labels named 'Mustang'. Accordingly, the user may be requested to create a subset $Y_{C1}$, comprising images of horses, and a second subset $Y_{C2}$ comprising images of cars.

'Clarifying Mode' and 'Extending Mode' are modes of user interface component employed for improving sets of resources, which, in the preferred embodiment have been classified or annotated to a certain degree. For example, a user may be presented with a set of images of roses, and requested to create subsets conforming to conditions such as 'Yellow rose', 'Red rose' and 'White rose'.

'New Description' mode involves providing users with a set of (possibly) random, unlabelled images, X and requesting the user populate a subset Y with images conforming to a given condition, C, for example, images that display a flower.

Creating the different condition or conditions associated with a query can be done in a number of ways.

For example, in new description mode, the terms of the original query can be used to form the condition set $C_1$, $C_2$, $C_3 \ldots C_N$. Now the user can select a condition from the condition set and then select any displayed images from the resource set which are relevant to that condition; and so on for each condition of the set with which the user wishes to associate one or more images of the resource set.

Alternatively, where a set of set of images S1 is displayed in response to a query, a user selects a first image and this becomes a condition C1. The user now selects any further images from the set which are relevant to category C1. Once complete, the user can either select another image from the resource set to start another condition C2; or else any images which have not been selected by the user as relevant to C1 can be labelled as irrelevant to C1—thus the resource set S1 is split to S1-C1-relevant and S1-C1-irrelevant. Optionally, the user can be asked to add a text label to the initial images forming a condition so that these might labels be used for non-image based searching.

In the preferred embodiment, a query Q could be in one language and a condition C in another language.

The information retrieved from the user interface component is subsequently utilised to modify the manner in which descriptions of resources are validated, disambiguated, classified and extended and the manner in which new descriptions are generated for such types of resources. In the preferred embodiment, additional factors, such as the user's account details, such as history log, and credibility rating are further employed in classifying the resources.

Clearly, by availing of direct user feedback in an information retrieval system or search engine the relevance, precision and recall of the classified resources are drastically improved.

In the preferred embodiment, a database is utilised for storage, indexing and classification of the resources.

The database is arranged to store and index resources such as images and video data by means of the context in which the resources arise and where applicable, according to labels describing content of the resources. For example, the database may store a link to a webpage comprising text relating to a florist and an image. Based on the context in which the image was displayed, i.e., a florist's webpage, the image is associated with a florist, and as such, indexed or classified as relating to flowers.

In the case that the image comprises a label or tag, the text of the label may be employed in order to further classify the image. For example, where the label recites 'bouquet of roses', the image may be classified as being associated with flowers, bouquets and roses.

Furthermore, in accordance with the preferred embodiment of the present invention, the database is arranged to classify the resources stored therein according to information retrieved from the user interface component 14, such as indications to the content of the images, as is described above.

The resources of the database are preferably associated with a set of appropriate conditions $C=\{C_1, C_2, C_3 \ldots C_N\}$. For example, where the database comprises an image indexed as a flower, a set of possible conditions associated with the image may include 'a daisy', 'a rose', 'a weed', and 'other'.

In the preferred embodiment, the resources of the database are associated with at least one query, Q, and a set of query appropriate conditions $C_Q=\{C_{Q1}, C_{Q2}, C_{Q3} \ldots C_{QN}\}$. For example, where the database comprises an image indexed as a flower, a possible query associated with the image may be 'A flower in bloom', and a set of possible conditions associated with the image may include 'yes', 'no', and 'this is not a flower'. However, it will be appreciated that the query may be associated with a generic set of conditions, such as 'yes', 'no', and 'don't know', or 'relevant' and 'irrelevant'.

It should be appreciated that conditions need not be limited to text and can include images, audio or video, or any combination thereof.

It will be further appreciated that the conditions presented to a user in connection with a specific set of images X, may be determined based on the information currently available in the database. For example, if there is very little information in the database about a particular resource, a generic or unspecific set of conditions may be provided to the user.

In the preferred embodiment, the user interface component 14 operates independently and when invoked, for example, by a user, the user interface component 14, selects a set X of images, corresponding conditions, $C=\{C_1, C_2, C_3 \ldots C_N\}$, and possibly a query, Q, for display from the database.

In one embodiment, the details provided to the user are pseudo randomly generated.

However, in the preferred embodiment, the user interface component 12 is arranged to identify the user, and retrieve information previously stored in that user's account, for example, his credibility rating, or information pertaining to any specialist subject the component deems associated with the user based on previous performance. For example, a user who has a history of correctly identifying types of flowers may be presented with a set X that the system has classified as roses, and requested to select a more specific subset comprising English roses.

In the preferred embodiment, information stored in a user's account may be supplemented by the user, to assist the component 14 in providing the user with suitable sets X of images. For example, a user may indicate that he is a botanist. Thus, in the more specialised cases, a botanist would more likely be requested to assist in the identification of images relating to plants, than for example, being requested to assist in the identification of parts of steam engines.

In another embodiment, the user interface component is arranged to operate in conjunction with results provided by an existing search engine, such as Google, Yahoo, and YouTube.

Figure 2:
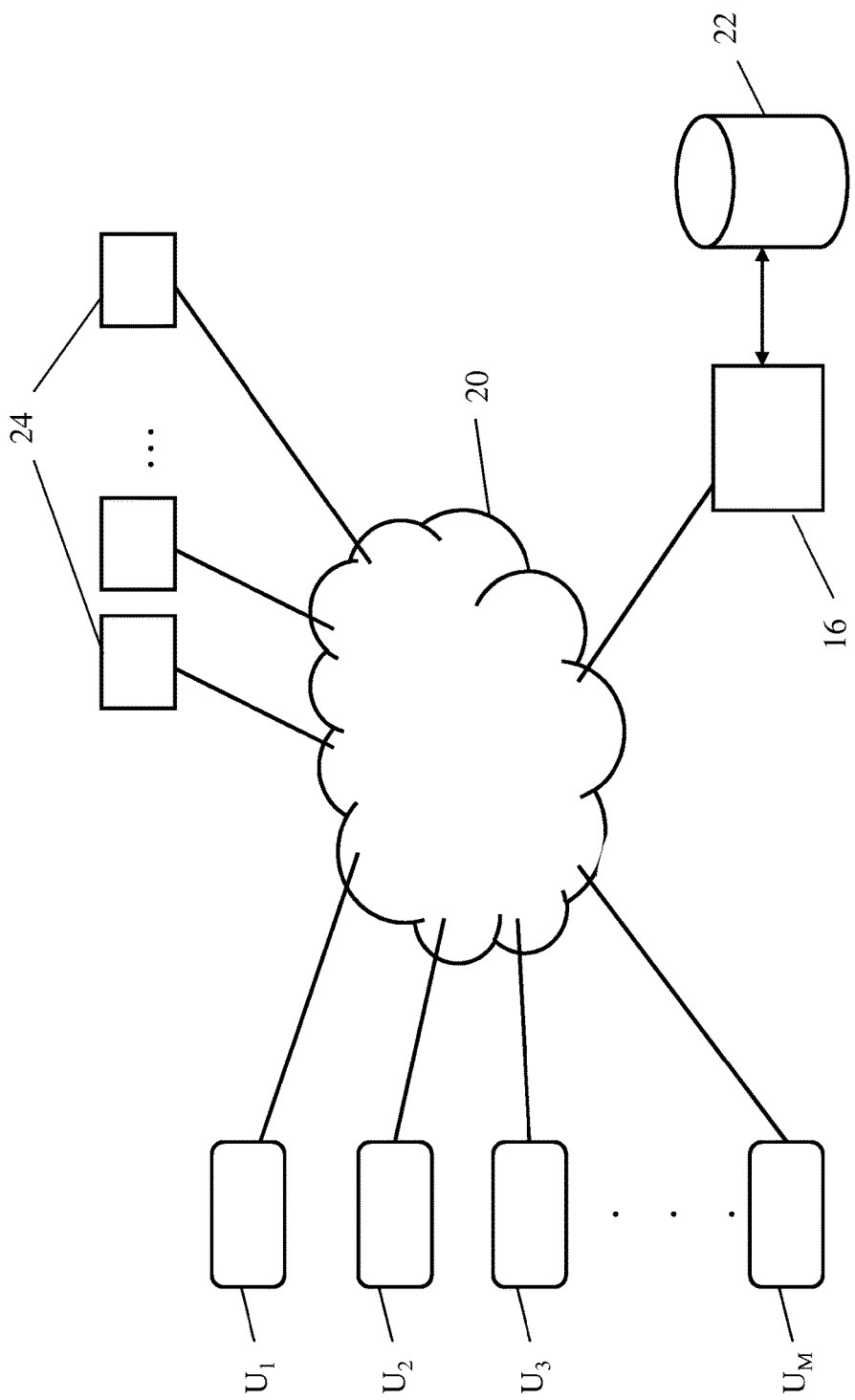
FIG. 2 illustrates a network comprising a search engine operable to provide the graphical user interface component of FIG. 1.

As exemplified in FIG. 2, a plurality of collaborating users, $U_1, U_2, U_3 \ldots U_M$, are arranged to communicate with a search engine, 16, across a network 20, for example, the Internet. The search engine 16 is in communication with a database 22 comprising resources, such as text, images, video, audio, etc. The resources are retrieved from various sources, such as web pages, 24, by using web crawler applications for example, or from users uploading resources to the search engine, as is the case with applications such as YouTube.

Referring to FIG. 2, on receipt of a search term from a user, $U_1, U_2, U_3 \ldots U_M$, the search engine 16 consults the database 22 to retrieve information deemed pertinent to the search term, and displays the information for review by the user in order of relevance. In this case, the list of resources presented to the user by the search engine as search results represent the set of resources X.

According to the preferred embodiment, in the case that the information deemed relevant to the user comprises text, image, audio and/or video data, the user interface component 14 is invoked and at least one condition C, deemed relevant to the search term, is presented to the user.

To this end, search terms are utilised further to consult the database 22 in order to retrieve at least one condition, C, associated with the search term. In one embodiment, the labels indexing images are examined to locate a condition or set of conditions suitable for presentation to the user in connection with the search engine results. In the preferred embodiment, at least the labels indexing images and queries associated therewith are examined to locate a condition or set of conditions suitable for presentation to the user.

For example, a user searching for the term 'flowers', is presented with a list of results the search engine deems relevant to the term 'flowers'. In addition, the term 'flowers' is identified as a relatively broad term, and as well as general conditions such as 'relevant' and 'irrelevant', more specific conditions, such as, 'wilted', 'blooming', and 'bouquet', may be presented to the user to retrieve more in-depth analysis of the images, thereby enabling more accurate indexing of the resources in the database 22.

In the preferred embodiment, specific conditions to be associated with queries are defined at the search engine. So for example, where a common query is identified, say 'flower', it may be considered useful to associate with that query (or broad condition), specific conditions such as 'wilted' etc.

Alternatively or in addition, narrow or specific search terms used in combination with a more generic or broader search term, can be stored in the database with the associated broader term and consequently may form the basis for a specific condition for representation with the resource. For example, a user searching for 'wilted flowers' may be presented with a number of resources, and conditions associated with those resources and/or search term. In addition, the narrower term 'wilted', may be extracted and stored in association with the broader term 'flower' for presentation as a suitable specific condition for a future search for 'flower'.

It will be appreciated that although the set of resources is exemplified as images, the set of resources may comprise text, image, audio, video, and/or any combination thereof.

For example, in the case that the set of resources comprises text, a search term 'Paris' may prompt the user to be queried 'Is the following text related to the city of Paris?', with conditions $C_1$, and $C_2$, of 'Yes' and 'No', respectively, being provided. This information would enable the resources to be more appropriately categorised, by removing text and information related to the celebrity Paris Hilton from a set of resources associated with the city of Paris in France.

Alternatively, or in addition, the query presented to the user may relate to an occurrence of an event in an audio file and/or video file, for example, an event regarding a conversation between a man and a woman. The query presented to the user may be 'Is the speaker a man', with the conditions $C_1$, and $C_2$, of 'Yes' and 'No', respectively, being provided. In such an embodiment, account is taken for a time lapse occurring between the instance of the person speaking and the user inputting a response by selecting a condition, to ensure the correct responses of the user are recorded. For example, where a man speaks first, closely followed by a woman speaking, by the time the user has reacted to indicate that a man is speaking, the woman may have begun to speak, a certain amount of time may be accorded to the user to provide the response, to thereby ensure that the correct information is being retrieved from the user and utilized for classification of the resources.

In the preferred embodiment, the search results are grouped together for display in accordance with the information available to the search engine from the database. For example, when a user searches for 'flowers', he or she may be presented with multiple images of flowers, which have been grouped together in sub-sets such that all flowers which have been labelled as 'blooming flowers', are presented first, followed by a set of flowers which have been labelled as 'wilted flowers', followed by a set of flowers which have been labelled as 'closed', and so on.

In the preferred embodiment, the graphical user interface presents the conditions as images. For example, the condition 'wilted' with respect to images of flowers, is represented as an image of a wilted flower. However, it will be appreciated that the term 'wilted' may be used instead of or in combination with the image as a condition. It will be further appreciated that the graphical user interface can be arranged to present the conditions as text, image, audio or video, or any combination thereof.

The present invention may be further implemented as a game, whereby one or more players are provided with sets of resources X, which they are required to classify according to conditions C, provided, in response to queries, Q, posed. The game may involve various degrees of difficulty, including time limits, varying sizes of sets of resources, content and numbers of competitors.

The present invention may also be implemented in as a contribution scheme, whereby users are awarded for contributing to the classification of the resources. For example, the reward may be delivered in a point system scale, whereby a user, having exceeded a certain points level, is rewarded by being published as having 'top score' in relation to the classification of a specific subject, for example.

The present invention is described in the context of a desktop computer and Web environment, but may either be run as a stand-alone program, or alternatively may be integrated in existing applications, operating systems, or system components to improve their functionality.

From the above description, it should be clear that queries can either be: user defined by inputting a query through the user interface; selected from a predefined by the system; or indeed queries could be machine generated.

Equally, conditions can either be: user defined through interaction with the user interface; selected from a predefined list; or machine generated.

Thus while in some cases the condition(s) could be the same as or correspond with the query, in others, the conditions can either be a part of the query, a variation of the query or be derived from the query so allowing for the many use cases of the invention outlined above.

The invention is not limited to the embodiment(s) described herein but can be amended or modified without departing from the scope of the present invention.

The invention claimed is:

1. An information retrieval system comprising:
   a memory, wherein the memory comprises a database;
   a display; and
   a processor, wherein when the information retrieval system is instigated by a user $U_I$, the processor
   is configured to provide a user interface (UI) component on the display, the UI component displays
     a query Q,
     a resource set X, the resource set X comprises a plurality of j resources $X_1$-$X_j$ retrieved by a search engine,
     a set of conditions comprising N conditions $C_1$-$C_N$, wherein
       a user interaction is initiated by requesting the user $U_I$ to select resources from the resource set X which conform to the N conditions $C_1$-$C_N$,
       selected resources form subsets of resources $Y_{UI, C1}$ to $Y_{UI, CN}$ for the user $U_I$ conforming to the N conditions $C_1$-$C_N$,
       the selected resources in the subsets of resources $Y_{UI, C1}$ to $Y_{UI, CN}$ are categorized into classifications, and
       the subsets of resources $Y_{UI, C1}$ to $Y_{UI, CN}$ for the user $U_I$ are stored in the memory as a collection set of resources $S_{UI}$, where $S_{UI}=\{Y_{UI, C1}$ to $Y_{UI, CN}\}$, and
     at least one condition $C_X$ invoked by the UI component by examining labels indexing resources from the selected resources and the query Q associated therewith to form a basis for a specific condition for representation with the resource set X, determines a group agreement parameter $G_{Xp,Ct}$ for each resource $X_p$ from the resource set X based on how many users out of all users who viewed the resource $X_p$ associated it with a certain condition $C_t$, wherein the certain condition $C_t$ can be from the N conditions $C_1$-$C_N$ and the at least one condition $C_X$, and assigns a user credibility factor β to the user $U_I$, the user credibility factor β is based on a discrepancy between selections made by the user $U_I$ and selections made by other users, wherein the user credibility factor β determines a weighting which is assigned to further selections by the user $U_I$, wherein the UI component is configured to switch between a plurality of operating modes comprising,
a validation mode, wherein the validation mode requests the user to verify descriptions or labels of the resources,
a clarifying mode, wherein the clarifying mode requests the user to improve the resource set to create the subsets of resources,
a disambiguation mode, wherein the disambiguation mode requests the user to create the subsets of resources to resolve ambiguities, and
a new description mode, wherein the new description mode requests the user to populate a subset of resources conforming to a given condition, wherein the database is configured to store, index and classify the resource set.

2. The information retrieval system according to claim 1 wherein:
the display is on an end user device of the user $U_I$;
the processor is part of the search engine;
wherein the search engine is in communication with the processor; and
wherein the end user device communicates with the search engine over a network.

3. The information retrieval system according to claim 1 wherein all users are assigned their respective credibility factor.

4. The information retrieval system according to claim 1 wherein the resource set X comprise any of: images, videos, text, audio, or any combination thereof.

5. The information retrieval system according to claim 1 wherein M users $U_1$-$U_M$ are collaborating users of the information retrieval system for classifying the resource set X.

6. The information retrieval system according to claim 1 wherein the query Q comprises:
a user defined query;
a user selected query from a pre-defined list; or
a machine generated query; and
wherein the query Q retrieves the resource set X.

7. The information retrieval system according to claim 1 wherein the N conditions $C_1$-$C_N$ comprises:
at least a user defined condition;
at least a user selected condition from a pre-defined list; or
at least a machine generated condition.

8. The information retrieval system according to claim 2 wherein the plurality of j resources $X_1$-$X_j$ are grouped together for display in accordance with information available to the search engine from the database.

9. The information retrieval system according to claim 5 wherein the M users $U_1$-$U_M$ are collaborating users of the information retrieval system and are assigned their respective credibility factor.

10. An information retrieval system comprising:
a memory, wherein the memory comprises a database;
a display; and
a processor, wherein when the information retrieval system is instigated by a user $U_I$, the processor
is configured to provide a user interface (UI) component on the display, the UI component displays
a query Q,
a resource set X, the resource set X comprises a plurality of j resources $X_1$-$X_j$ retrieved by a search engine,
a set of conditions comprising N conditions $C_1$-$C_N$, wherein
user interaction is initiated by requesting the user $U_I$ to select resources from the resource set X which conforms to the N conditions $C_1$-$C_N$,
selected resources form subsets of resources $Y_{UI, C1}$ to $Y_{UI, CN}$ for the user $U_I$ conforming to the N conditions $C_1$-$C_N$,
the selected resources in the subsets of resources $Y_{UI, C1}$ to $Y_{UI, CN}$ are categorized into classifications, and
the subsets of resources $Y_{UI, C1}$ to $Y_{UI, CN}$ for the user $U_I$ are stored in the memory as a collection set of resources $S_{UI}$, where $S_{UI}=\{Y_{UI, C1}$ to $Y_{UI, CN}\}$, and
at least one condition $C_X$ invoked by the UI component by examining labels indexing resources from the selected resources and the query Q associated therewith to form a basis for a specific condition for representation with the resource set X, and
determines a group agreement parameter $G_{Xp,Ct}$ for each resource $X_p$ from the resource set X based on how many users out of all users who viewed the resource $X_p$ associated it with a certain condition $C_t$, wherein the certain condition $C_t$ can be from the N conditions $C_1$-$C_N$ and the at least one condition $C_X$,
wherein the UI component is configured to switch between a plurality of operating modes comprising,
a validation mode, wherein the validation mode requests the user to verify descriptions or labels of the resources,
a clarifying mode, wherein the clarifying mode requests the user to improve the resource set to create the subsets of resources,
a disambiguation mode, wherein the disambiguation mode requests the user to create the subsets of resources to resolve ambiguities, and
a new description mode, wherein the new description mode requests the user to populate a subset of resources conforming to a given condition,
wherein the database is configured to store, index and classify the resource set.

11. The information retrieval system according to claim 10 further comprises assigning a user credibility factor β to the user $U_I$ by the processor, the user credibility factor β is based on a discrepancy between selections made by user $U_I$ and selections made by other users, wherein the user credibility factor β determines a weighting which is assigned to further selections by the user $U_I$.

12. The information retrieval system according to claim 11 wherein all users are assigned their respective credibility factor.

13. The information retrieval system according to claim 10 wherein M users $U_1$-$U_M$ are collaborating users of the system for classifying the resource set X.

14. The information retrieval system according to claim 10 wherein the resource set X comprises any of: images, videos, text, audio, or any combination thereof.

15. A method of retrieving information comprising:
providing a query Q to a search engine, wherein the search engine is in communication with a database comprising resources;
retrieving from the search engine a resource set X, the resource set X comprises a plurality of j resources $X_1$-$X_j$;
providing to a display via a user interface (UI) component, a representation of the resource set X and a representation of a condition set C, the condition set comprises a plurality of N conditions $C_1$-$C_N$;
requesting a user $U_I$ to select resources from the resource set X which conform to the condition set C for classifying the selected resources;
invoking at least one condition $C_X$ by the UI component by examining labels indexing resources from the selected resources and the query Q associated therewith to form a basis for a specific condition for representation with the resource set X; and
calculating determining a group agreement parameter $G_{Xp,Ct}$ for each resource $X_p$ from the resource set X based on how many users out of all users who viewed the resource $X_p$ associated it with a certain condition $C_t$, wherein the certain condition $C_t$ can be from the N conditions $C_1$-$C_N$ and the at least one condition $C_X$,
wherein the UI component is configured to switch between a plurality of operating modes comprising,
a validation mode, wherein the validation mode requests the user to verify descriptions or labels of the resources,
a clarifying mode, wherein the clarifying mode requests the user to improve the resource set to create the subsets of resources,
a disambiguation mode, wherein the disambiguation mode requests the user to create the subsets of resources to resolve ambiguities, and
a new description mode, wherein the new description mode requests the user to populate a subset of resources conforming to a given condition,
wherein the database is configured to store, index and classify the resource set.

16. A non-transitory computer readable medium including program instructions which, when executed by a processor, cause the processor to perform:
providing a query Q to a search engine, wherein the search engine is in communication with a database comprising resources;
retrieving from the search engine a resource set X, the resource set X comprises a plurality of j resources $X_1$-$X_j$;
providing to a display via a user interface (UI) component, a representation of the resource set X and a representation of a set of N conditions $C_1$-$C_N$;
requesting a user $U_I$ to select resources from the resource set X which conform to the set of N conditions $C_1$-$C_N$;
invoking at least one condition $C_X$ by the UI component by examining labels indexing resources from the selected resources and the query Q associated therewith to form a basis for a specific condition for representation with the resource set X;
determining a group agreement parameter $G_{Xp,Ct}$ for each resource $X_p$ from the resource set X based on how many users out of all users who viewed the resource $X_p$ associated it with a certain condition $C_t$, wherein the certain condition $C_t$ can be from the N conditions $C_1$-$C_N$ and the at least one condition $C_X$; and
assigning a user credibility factor β to the user $U_I$, the user credibility factor β is based on a discrepancy between selections made by the user $U_I$ and selections made by other users, wherein the user credibility factor β determines a weighting which is assigned to further selections by the user $U_I$,
wherein the UI component is configured to switch between a plurality of operating modes comprising,
a validation mode, wherein the validation mode requests the user to verify descriptions or labels of the resources,
a clarifying mode, wherein the clarifying mode requests the user to improve the resource set to create the subsets of resources,
a disambiguation mode, wherein the disambiguation mode requests the user to create the subsets of resources to resolve ambiguities, and
a new description mode, wherein the new description mode requests the user to populate a subset of resources conforming to a given condition,
wherein the database is configured to store, index and classify the resource set.

17. A non-transitory computer readable medium including program instructions which, when executed by a processor, cause the processor to perform:
providing a query Q to a search engine, wherein the search engine is in communication with a database comprising resources;
retrieving from the search engine a resource set X, the resource set X comprises a plurality of j resources $X_1$-$X_j$;
providing to a display via a user interface (UI) component, a representation of the resource set X and a representation of a set of N conditions $C_1$-$C_N$;
requesting a user $U_I$ to select resources from the resource set X which conform to the set of N conditions $C_1$-$C_N$;
invoking at least one condition $C_X$ by the UI component by examining labels indexing resources from the selected resources and the query Q associated therewith to form a basis for a specific condition for representation with the resource set X; and
determining a group agreement parameter $G_{Xp,Ct}$ for each resource $X_p$ from the resource set X based on how many users out of all users who viewed the resource $X_p$ associated it with a certain condition $C_t$, wherein the certain condition $C_t$ can be from the N conditions $C_1$-$C_N$ and the at least one condition $C_X$,
wherein the UI component is configured to switch between a plurality of operating modes comprising,
a validation mode, wherein the validation mode requests the user to verify descriptions or labels of the resources,
a clarifying mode, wherein the clarifying mode requests the user to improve the resource set to create the subsets of resources,
a disambiguation mode, wherein the disambiguation mode requests the user to create the subsets of resources to resolve ambiguities, and
a new description mode, wherein the new description mode requests the user to populate a subset of resources conforming to a given condition, wherein the database is configured to store, index and classify the resource set.

18. A method of retrieving information comprising:
providing a query Q to a search engine, wherein the search engine is in communication with a database comprising resources;
retrieving from the search engine a resource set X, the resource set X comprises a plurality of j resources $X_1$-$X_j$;
providing to a display via a user interface (UI) component, a representation of the resource set X and a representation of a set of N conditions $C_1$-$C_N$;
requesting a user $U_I$ to select resources from the resource set X which conform to the set of N conditions $C_1$-$C_N$;
invoking at least one condition $C_X$ by the UI component by examining labels indexing resources from the selected resources and the query Q associated therewith to form a basis for a specific condition for representation with the resource set X; and
assigning a user credibility factor β to the user $U_I$, the user credibility factor β is based on a discrepancy between selections made by the user $U_I$ and selections made by other users, wherein the user credibility factor β determines a weighting which is assigned to further selections by the user $U_I$,
wherein the UI component is configured to switch between operate in at least one of a plurality of operating modes comprising,
  a validation mode, wherein the validation mode requests the user to verify descriptions or labels of the resources,
  a clarifying mode, wherein the clarifying mode requests the user to improve the resource set to create the subsets of resources,
  a disambiguation mode, wherein the disambiguation mode requests the user to create the subsets of resources to resolve ambiguities, and
  a new description mode, wherein the new description mode requests the user to populate a subset of resources conforming to a given condition,
wherein the database is configured to store, index and classify the resource set.

\* \* \* \* \*